J. L. CASE.
FODDER TIER.
APPLICATION FILED AUG. 17, 1915.
1,188,897.
Patented June 27, 1916.
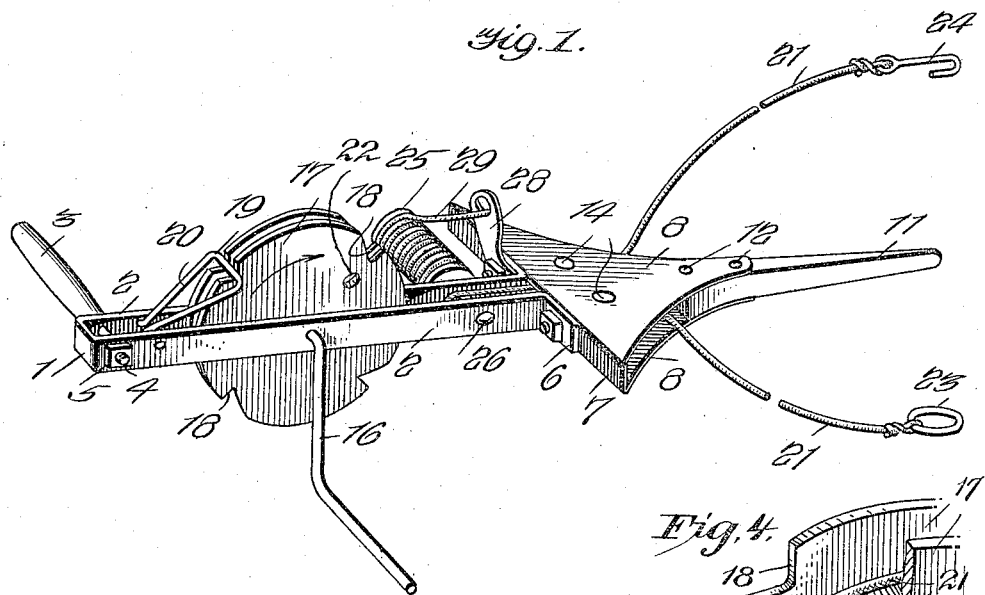
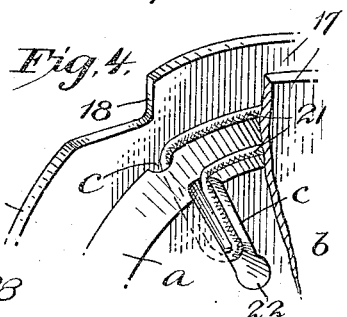
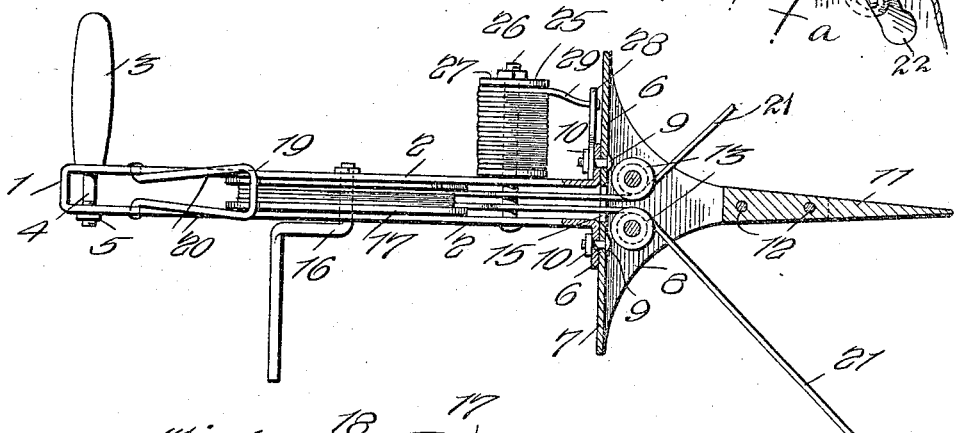
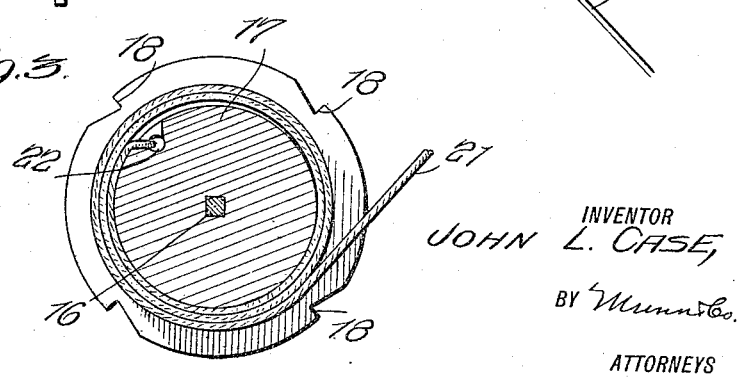
WITNESSES:
INVENTOR
JOHN L. CASE,
BY Munn & Co.
ATTORNEYS
THE COLUMBIA PLANOGRAPH CO., WASHINGTON, D. C.

UNITED STATES PATENT OFFICE.

JOHN L. CASE, OF WILLSHIRE, OHIO.

FODDER-TIER.

1,188,897.

Specification of Letters Patent.

Patented June 27, 1916.

Application filed August 17, 1915. Serial No. 45,941.

*To all whom it may concern:*

Be it known that I, JOHN L. CASE, a citizen of the United States, and a resident of Willshire, in the county of Van Wert and State of Ohio, have invented certain new and useful Improvements in Fodder-Tiers, of which the following is a specification.

My invention is an improvement in fodder tiers, and the invention has for its object to provide a device of the character specified for facilitating the tying of fodder in shocks or bundles with twine, wherein mechanism is provided for compressing the shock or the bundle, in such manner that the shock will not be twisted when raised from the ground, nor moved out of plumb or balance, and will be held evenly braced from all sides during the placing of a tie.

In the drawings: Figure 1 is a perspective view of the improved tier; Fig. 2 is a top plan view of the parts in section; and Fig. 3 is an enlarged transverse section of the pulley or reel. Fig. 4 is a detail perspective view of a portion of the reel.

The present embodiment of the invention comprises a substantially U-shaped frame consisting of a body 1, and arms 2 extending parallel in spaced relations, and a handle 3 is connected with that end of the frame adjacent to the user, the said handle having a threaded extension 4, which is passed through registering openings in the arms 2 adjacent to the body 1, and is engaged by a nut 5 to hold the parts in place.

At the end remote from the handle, each of the arms 2 is provided with a lateral outwardly extending lug 6, and to these lugs is secured a U-shaped casing, comprising a body 7 and side walls 8 which extend parallel with each other in spaced relation.

Bolts 9 are passed through the body between the side walls 8, and through registering openings in the lugs 6, and each bolt is engaged by a nut 10, to clamp the lugs to the casing.

The walls 8 of the casing gradually decrease in width toward their outer ends, and a pointed bar 11 is secured between the walls, by means of rivets 12 or the like.

Pulleys 13 are journaled between the side walls of the casing, on each side of the center of the body, and on rivets 14 or the like, and the said pulleys are spaced apart from each other, and are at the opposite ends of a passage 15 in the body and at the center thereof.

A crank shaft 16 is journaled transversely of the arms intermediate their ends, and a reel 17 is secured to the shaft. The flanges of the reel have notches 18, which are adapted for engagement by a pawl. This pawl is U-shaped, comprising a body 19 and arms 20 extending approximately parallel from the ends of the body, and each arm is journaled in one of the arms 2 of the frame.

The body of the pawl is adapted to engage the notches 18 of the reel. An endless flexible member 21, as for instance, a cord, or wire, is wound upon the reel, the central portion of the cord passing through an opening 22 in the reel near the periphery of the body portion thereof, and the ends of the cord or wire pass between the arms of the frame, and through the opening 15 of the casing, each end passing over a pulley 13.

One of the ends is provided with a ring 23, and the other end is provided with a hook 24 for engaging the ring 23.

The reel comprises a disk-shaped body $a$ and plates $b$ secured to opposite sides of the body, with their edge portions projecting beyond the peripheral wall of the body to form retaining flanges for the flexible member or binder 21. The body and side plates are formed with registering openings designated generally at 22. The body $a$ is formed in its opposite sides with grooves $c$ which extend outwardly from the ends of the opening 22 and form passages between the said body and plates $b$ for the reception of the binder 21. The plates $b$ close the open sides of the grooves $c$. By this means positive connection is provided between the reel and the binder 21 and the latter may be placed in position and adjusted without requiring removal of the reel from the frame or the separation of the plates $b$ from the body $a$.

In operation, the ends of the cord 21 are withdrawn and passed around the shock, and the hook 24 is engaged with the ring 23. The pointed bar 11 is driven into the shock, the operator grasping the handle 3 with the left hand, and the crank of the shaft 16 with the right hand. The pointed bar 11 steadies the device, and with the parts in this position the operator rotates the shaft 16 to wind up the cord 21. As the cord is wound up, it will be evident that the flexible member 21 will be tightened around the shock to compress the same, and since the compression, or rather the tension is equal from both sides, the shock will not be twisted or turned, but will be evenly and uniformly compressed. The pawl 19—20 by its engagement with the notches 18 will prevent reverse rotation of the reel, and will hold the shock compressed until it can be tied. To facilitate the tying, a second reel 25 is mounted on a bolt 26, which is passed through registering openings in the arms near the casing, and a nut 27 is threaded onto the bolt to prevent disengagement of the reel. A guide plate 28 is secured to the body of the casing 7—8, by one of the bolts 9, and one end of the tying cord 29, which is wound upon the reel 25, passes through an eye or opening in the plate. After the shock has been compressed, as above stated, the end of the flexible member 29 on the reel 25 is withdrawn through the opening of the guide plate 28, and is passed around the compressed shock and tied. When the shock has been tied, the pawl 19—20 is lifted out of engagement with the notches 18 of the reel, 17, and the hook 24 is released from the ring 23. The surplus cord is wound up on the reel 17, and the device is ready for another operation.

It will be evident from the description that the shock will not be twisted during the compression, nor will it be raised from the ground, nor moved out of plumb. The compression is uniform, and the pointed bar 11 firmly anchors the frame to the shock. The eye or opening 22 in the reel provides a simple and easy method of attaching the compressing cord.

In practice, the hook 24 will be a snap hook, in order that it may not become accidentally disengaged. The binding or compressing cord 21 is of suitable length to encircle the shock, and the pulleys 13 prevent friction on the cord as it passes through the opening 15 of the casing.

The ends of the compressing member 21 pass over the bolt 26, which serves as a guide to prevent friction against the bottom of the opening 15. It will be evident that a roller might be journaled on this bolt between the arms if desired.

I claim:

1. A device of the character specified, comprising a substantially yoke-shaped frame consisting of a body and arms extending parallel from the ends of the body, a reel between the arms, a crank shaft to which the reel is secured, said reel having notches in its periphery, and a pawl pivoted to the frame and engaging the notches to prevent reverse rotation of the reel, said reel having a transverse opening near its periphery, and a flexible compressing member having its central portion passed through the opening and winding on the reel, the ends of the flexible member passing between the arms of the frame and having means for detachably connecting the said ends, a substantially U-shaped casing comprising a body and side walls extending parallel from the body, said body being secured to the ends of the arms of the frame remote from the body, and said body having an opening between the arms through which the ends of the flexible member pass, a pointed guide bar connected to the side walls in alinement with the opening of the body, and a pulley on each side of the opening, and journaled in the casing, and a handle extending laterally from the frame at the end adjacent to the body.

2. A device of the character specified, comprising a substantially yoke-shaped frame consisting of a body and arms extending parallel from the ends of the body, a reel between the arms, a crank shaft to which the reel is secured, said reel having notches in its periphery, and a pawl pivoted to the frame and engaging the notches to prevent reverse rotation of the reel, said reel having a transverse opening near its periphery, and a flexible compressing member having its central portion passed through the opening and winding on the reel, the ends of the flexible member passing between the arms of the frame and having means for detachably connecting the said ends, a substantially U-shaped casing comprising a body and side walls extending parallel from the body, said body being secured to the ends of the arms of the frame remote from the body, and said body having an opening between the arms through which the ends of the flexible members pass, a pointed guide bar connected to the side walls in alinement with the opening of the body, and a pulley on each side of the opening, and journaled in the casing.

3. A device of the character specified, comprising a main frame embodying laterally spaced members, a second frame secured to an end of the main frame and projecting forwardly therefrom and comprising vertically spaced members, a pointed member extending outwardly from the second frame, guide elements disposed in the spaces formed between the vertically spaced members of the second frame, a reel mounted between the laterally spaced members of the main frame, means for securing the reel in the required adjusted position, and a flexible embracing member adapted to be wound upon the reel and passing between the members of the two frames and around the guide elements.

4. In a device of the character specified, a frame, a flexible binder and a reel for the said binder comprising a central portion and spaced flanges, said reel having a transverse opening and passages leading from the ends of the transverse opening outwardly through the peripheral wall of the body inside of the inner walls of the flanges, said transverse opening and passages receiving the binder.

5. In a device of the character specified, a frame, a flexible binder and a reel for the said binder comprising a body and side plates, the body having a transverse opening and grooves in its sides extending outwardly from the ends of the transverse opening, the binder passing through the transverse opening and the grooves, and the side plates closing the outer sides of the grooves and projecting outwardly from the body to form flanges.

JOHN L. CASE.

Witnesses:
J. T. CULLY,
MARY CULLY.

Copies of this patent may be obtained for five cents each, by addressing the "Commissioner of Patents, Washington, D. C."